UNITED STATES PATENT OFFICE.

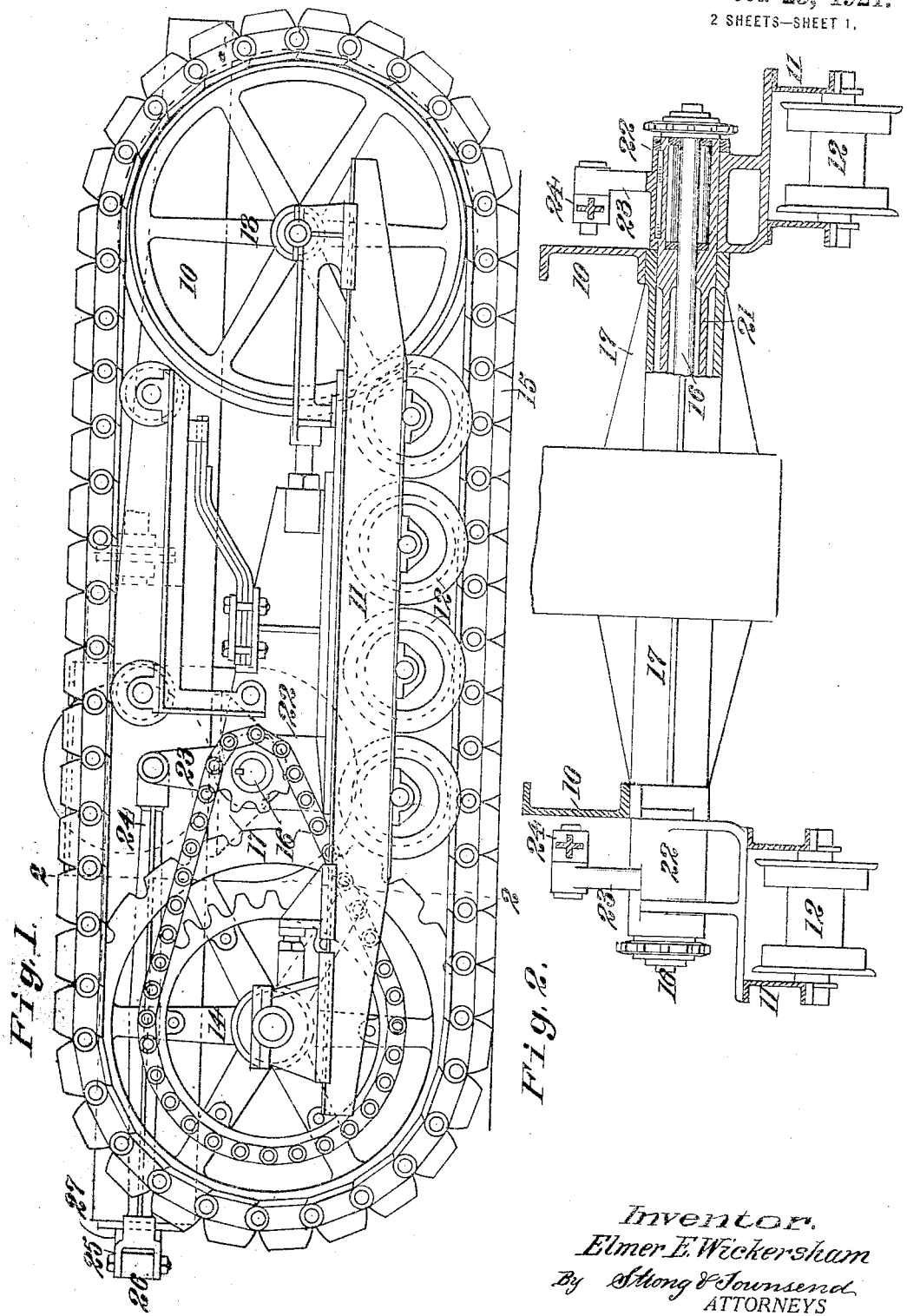

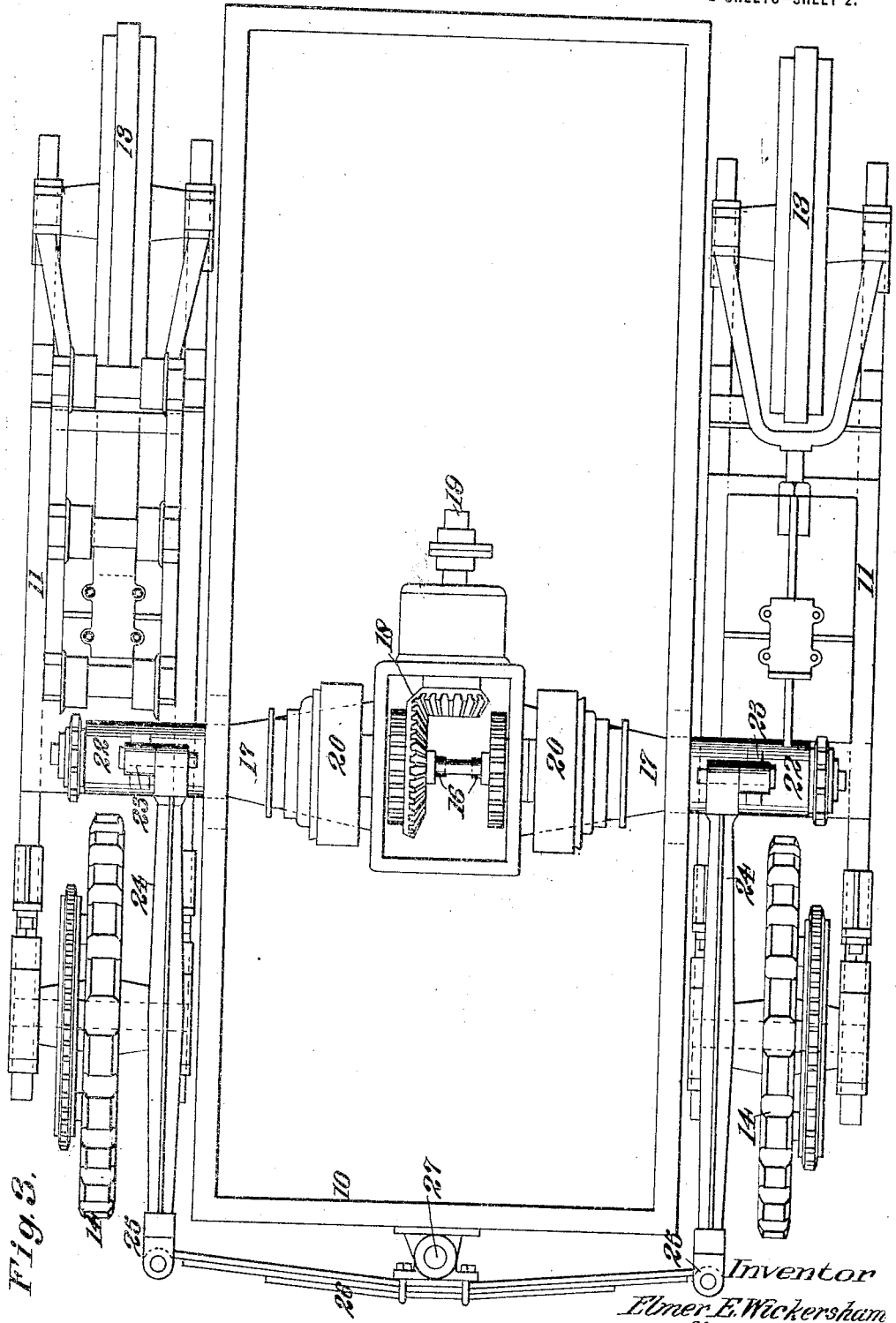

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR-FRAME SUSPENSION.

1,395,025.

Specification of Letters Patent.   Patented Oct. 25, 1921.

Application filed September 29, 1919. Serial No. 327,285.

*To all whom it may concern:*

Be it known that I, ELMER E. WICKERSHAM, a citizen of the United States, residing at Stockton, in the county of San Joaquin and State of California, have invented new and useful Improvements in Tractor-Frame Suspensions, of which the following is a specification.

This invention relates to tractors of the chain track type, and more particularly to means for suspending the main frame on the truck mechanisms.

The object of the invention is to provide supporting means for the main frame having a single point of connection only with each truck mechanism. This method of supporting the main frame is shown and described in my prior application, Serial No. 314,205, filed July 30th, 1919, and the present application contemplates a specifically different mounting for the main frame wherein there has been a simplification and improvement of the mechanism throughout.

In the present invention I employ a rigid truck frame for each of the truck mechanisms and journal the driving sprocket wheel on this truck frame. The driving axle for the sprocket wheels is arranged forwardly of the latter and the housing for this driving axle is made use of to support the main frame upon the truck mechanisms. As a means for stabilizing the main frame I make use of a leaf spring at the rear thereof and connect the same by links to rock arms formed on the pivot bearings of the truck frames.

Referring to the accompanying drawings:

Figure 1 shows a side elevation of a tractor embodying my invention.

Fig. 2 shows a sectional view taken on the line 2—2 of Fig. 1.

Fig. 3 shows a plan view of the device shown in Fig. 1.

A tractor main frame is indicated at 10 and at each side thereof is a chain track truck mechanism made up each of a truck frame 11 on which is journaled a series of supporting rollers 12. An idler sprocket wheel 13 is carried at the forward end of the truck frame and a toothed sprocket wheel 14 is journaled on the rear of this frame. An endless chain track 15 is carried by the sprocket wheels 13 and 14 and forms a track for the rollers 12.

To support the main frame on the truck frames 11 and to drive the sprocket wheels 14 I provide a two-part shaft 16 journaled in a housing 17 carried upon the main frame at a point forwardly of the sprocket wheels 14. Gearing 18 connects the propeller 19 with the axle 16, and a clutch mechanism 20 is included in each part of the driving axle for throwing either side out of gear whereby to steer and turn the tractor. Carried within the housing 17 and surrounding the driving axle 16 is a sleeve 21 at each side of the main frame projecting from the housing 17 and having keyed to its projecting end a bearing 22 formed on the adjacent truck frame. Extending upwardly and formed integral with the bearing 22 is an arm 23, the upper end of which has a link 24 pivotally connected thereto and extending rearwardly and pivoted at 25 to one end of a leaf spring 26. The leaf spring 26 is pivotally mounted at 27 on the rear end of the main frame and at its opposite end it has a connection similar to that already described with the adjacent truck mechanism.

In the operation of the tractor the main frame is supported entirely upon the truck frames through the sleeves 21 carried in the housing 17. The main frame is held against tilting independently on these sleeves 21 by the rock arms 23 and their connections with the leaf spring 26. Each truck mechanism is free to rock about its pivotal connection with the main frame and when one truck is lifted upwardly at its forward end, as in passing over an obstruction, the opposite truck mechanism will be moved downwardly at its forward end to an extent equal to the upward movement of the first truck mechanism on account of the equalizing connection between. However, if the truck mechanism, which has the downward thrust applied thereto, is in contact with the ground and unable to move downwardly the spring 26 will be flexed to an extent sufficient to permit the necessary upward movement of the truck mechanism passing over the obstruction, without imparting any substantial movement to the main frame. In fact, due to the presence of the spring 26, the main frame will maintain its position at all times, whereas the truck mechanisms will be free to rise and fall to accommodate themselves to irregularities in the surface of the ground. In other words, the spring 26 is so constructed that it will flex without raising the main frame.

Having thus described my invention, what I claim and desire to secure by Letters Patent is:

1. In a tractor, a main frame, a chain track truck mechanism at each side thereof, a driving axle for the chain track, a housing for the axle serving to support the entire weight of the main frame on the truck mechanisms, said truck mechanisms being free to rock about their connection with the main frame and resilient means to stabilize the main frame.

2. In a tractor, a main frame, a chain track truck mechanism at each side thereof, a driving axle for the chain track, a housing for the axle serving to support the entire weight of the main frame on the truck mechanisms, said truck mechanisms being free to rock about their connection with the main frame and resilient means to stabilize the main frame, said means acting to impart a downward thrust on one truck mechanism when the other one is raised.

3. In a tractor, a main frame, a truck mechanism at each side comprising a roller truck frame on which are journaled a driving and an idler sprocket wheel, a driving axle carried upon the main frame and operatively connected with the sprocket wheel, a housing for said axle serving also to support the entire weight of the main frame on the truck frames, said truck mechanisms being free to rock about their point of connection with the main frame, a rock arm formed on each truck frame and a spring connected with the main frame and to opposite rock arms for stabilizing the main frame.

4. In a tractor, a main frame, a truck mechanism at each side comprising a roller truck frame on which are journaled a driving and an idler sprocket wheel, a driving axle carried upon the main frame and operatively connected with the sprocket wheel, a housing for said axle serving also to support the entire weight of the main frame on the truck frames, said truck mechanisms being free to rock about their point of connection with the main frame, a rock arm formed on each truck frame and a leaf spring pivotally mounted on the main frame and having its opposite ends connected with said rock arms.

5. In a vehicle, a main frame, a chain track truck mechanism at each side thereof, means for supporting the main frame at a single point on each truck mechanism, said means comprising an axle about which the truck mechanisms are free to rock, a rock arm on each truck mechanism, a leaf spring pivotally mounted on the main frame extending transversely thereof and a connection between each end of the leaf spring and one of the rock arms, said leaf spring serving to stabilize the main frame and operating to impart a downward thrust to one truck mechanism upon an upward movement of the opposite truck mechanism.

In testimony whereof I have hereunto set my hand in the presence of two subscribing witnesses.

ELMER E. WICKERSHAM.

Witnesses:
W. W. HEALEY,
J. H. HERRING.